United States Patent [19]

Kiteley et al.

[11] Patent Number: 4,645,987

[45] Date of Patent: Feb. 24, 1987

[54] VERTICAL COMPENSATION CIRCUIT UTILIZING VARIABLE GAIN AMPLIFIER

[75] Inventors: Terence J. Kiteley, Schaumburg; Sudthichard Vasavanonda, Morton Grove, both of Ill.

[73] Assignee: Zenith Electronics Corporation, Glenview, Ill.

[21] Appl. No.: 808,206

[22] Filed: Dec. 12, 1985

[51] Int. Cl.[4] .................... H01J 29/70; H01J 29/72
[52] U.S. Cl. ................................. 315/389; 315/403
[58] Field of Search ............... 315/387, 389, 403, 399

[56] References Cited

U.S. PATENT DOCUMENTS 4,031,430 6/1977 Enomoto ........................... 315/403
4,243,918 1/1981 Meise ............................... 315/403

Primary Examiner—Theodore M. Blum

[57] ABSTRACT

A vertical compensation circuit for a digital TV receiver having a vertical drive signal that is insensitive to changes in CRT beam current includes a variable gain amplifier and means for sensing changes in B+ operating potential that track changes in CRT high voltage which is related to CRT beam current. The voltage sensing means detects a change in B+ operating potential and applies a voltage indicative of that change to a feedback circuit for changing the feedback level on a variable gain amplifier to which the vertical drive signal is applied.

5 Claims, 4 Drawing Figures

VERTICAL COMPENSATION CIRCUIT UTILIZING VARIABLE GAIN AMPLIFIER

CROSS REFERENCE TO RELATED APPLICATION

This application is related to application Ser. No. 808,207 filed Dec. 12, 1985, in the name of G. Srivastrava and S. Lai, entitled Digital TV With Vertical Compensation and assigned to Zenith Electronics Corporation.

BACKGROUND OF THE INVENTION

This invention relates generally to vertical compensation circuits for television receivers (TVs) and specifically to vertical compensation circuits for digital television receivers.

The above mentioned copending application describes the difficulty encountered in digital television receivers with changes in vertical size of the screen display or raster with fluctuations in beam current in the cathode ray tube (CRT). In analog TVs, a large degree of self compensation is incorporated by using a vertical oscillator having its B+ operating voltage supplied from the horizontal deflection and high voltage system. In that arrangement the amplitude of the sawtooth drive waveform produced by the vertical oscillator changes in the same direction as changes in the high voltage or B+ supply of the TV. Should the CRT beam current increase (and result in a decrease in the high voltage supplied to the CRT), the electron beam becomes "easier" to deflect. Without a compensating change in the amplitude of the vertical drive waveform, the vertical size of the raster will increase. By linking the vertical oscillator to a B+ supply that is tied to the high voltage supply, the amplitude of the vertical drive waveform is diminished and tends to compensate for the lower high voltage.

In digital TVs, there is no vertical oscillator. On the contrary, the vertical drive signal is derived by integration of a pulse width modulated (PWM) signal having a substantially constant amplitude that is independent of variations in the B+ and high voltage supplies. Therefore, a change in high voltage (or B+) does not affect the amplitude of the vertical drive signal, which remains substantially constant. The result is that the size of the raster, in the vertical direction, changes inversely with changes in B+ voltage (and high voltage). This creates an objectionable viewing situation. In the above mentioned copending application a solution to the problem entails provision of compensation means, responsive to changes in the B+ supply voltage, for changing the amplitude of the PWM signal prior to development of the vertical drive signal. The present invention provides an alternative solution to this problem by operating directly on the vertical drive signal to change its amplitude with B+ changes. Thus, in the present invention an amplifier in the vertical deflection system has its gain varied as a function of the B+ potential, which is related to the TV high voltage. Specifically, in the preferred embodiment of the invention the vertical deflection system includes a feedback circuit, the impedance of which is changed as a function of an output from voltage sensing means that sense changes in the B+ supply.

OBJECTS OF THE INVENTION

A principal object of the invention is to provide a novel vertical compensation system for a digital television receiver.

Another object of the invention is to provide a digital television receiver with an improved vertical raster size stability.

BRIEF DESCRIPTION OF THE DRAWINGS

Other objects and advantages of the invention will be apparent upon reading the following description in conjunction with the drawings in which.

DESCRIPTION OF THE PREFERRED EMBODIMENT

Figure 1:
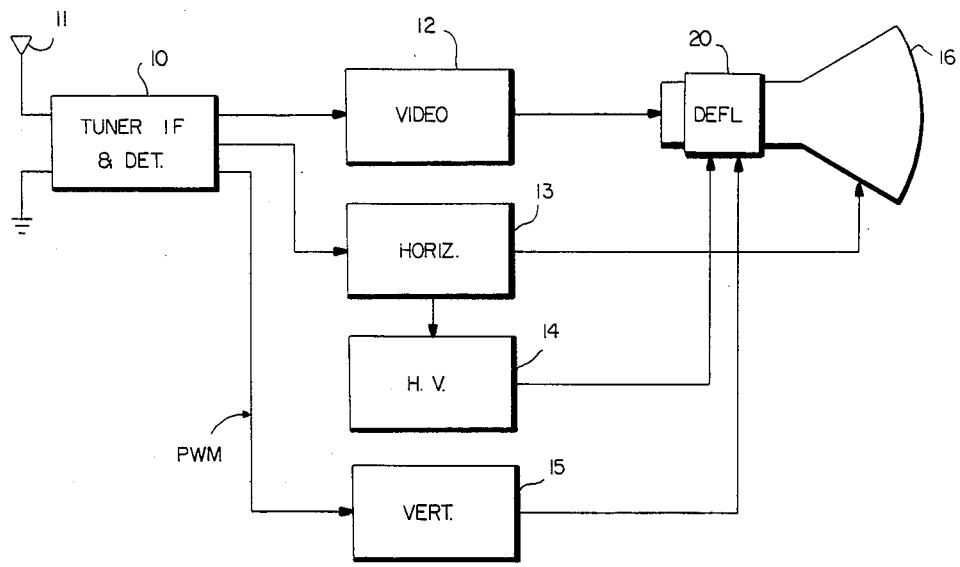
FIG. 1 is a simplified block diagram of a digital television receiver.

Referring to FIG. 1, a tuner, IF amplifier and detector is enclosed in a block 10 that is supplied with television signals by means of an antenna 11. Block 10 has outputs connected to a video processor 12, a horizontal system 13 and a vertical system 15. The connection between block 10 and vertical system 15 is indicated as carrying a PWM signal. The output of video processor 12 is supplied to a CRT 16. A block 20, labelled DEFL, is shown on the neck of CRT 16 and includes the deflection circuit, that is, the deflection coils and other well-known elements for providing horizontal and vertical magnetic fields for deflecting the electron beam across the phosphor covered face plate of the CRT to produce a raster. Horizontal system 13 is shown supplied to a block 14 labelled H.V. which provides the required high voltage operating potential for CRT 16. With the exception of the connection supplying the PWM vertical signals to vertical system 15, the TV of FIG. 1 is conventional.

As mentioned, the PWM signal does not change in amplitude with changes in the beam current of CRT 16. Consequently in a digital television environment, a change in CRT beam current will give rise to a corresponding change in the vertical size of the raster produced. This follows because the amplitude of the vertical drive signals remain substantially constant while the CRT high voltage changes with changes in CRT beam current. It should be borne in mind that throughout this specification and claims that, except where indicated, the B+ operating potential shown is derived from or otherwise closely related to, the CRT high voltage potential so that changes in high voltage, resulting from beam current changes, will be reflected in changes in the B+ operating potential. This arrangement is in consonance with conventional television practice.

Figure 2:
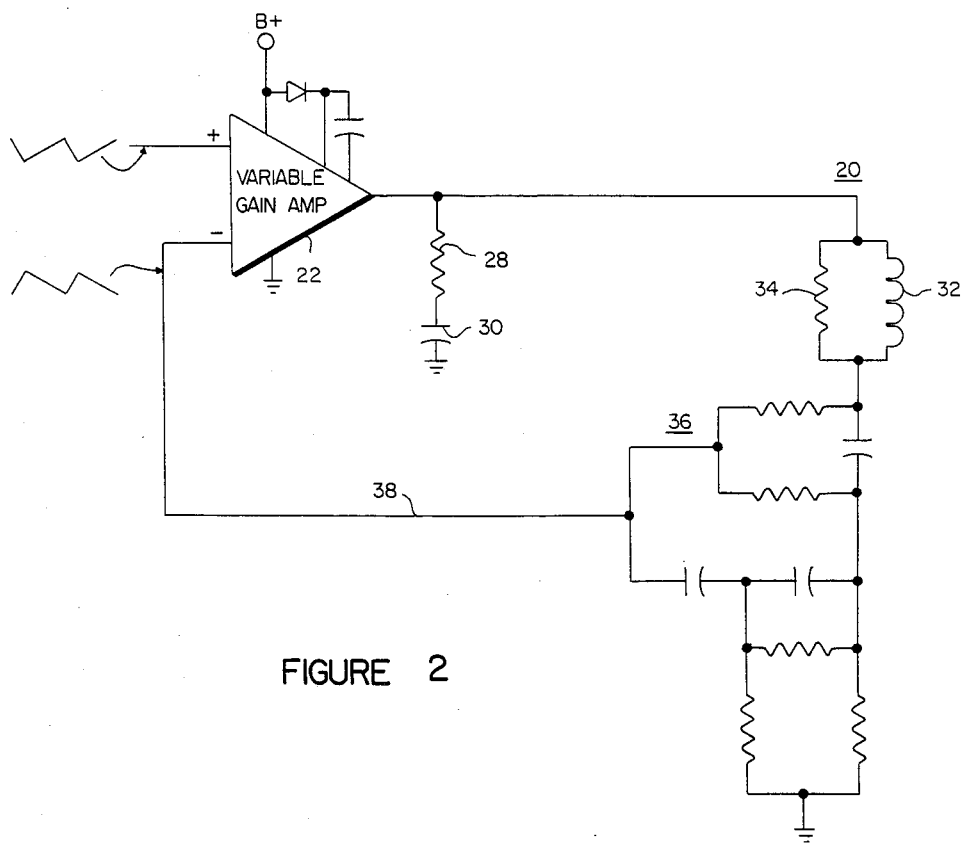
FIG. 2 is a schematic diagram of the vertical deflection portion of the receiver of FIG. 1 illustrating the invention.

In FIG. 2, a portion of vertical system 15 and deflection circuit 20 illustrating the basic operating principle of the invention, is shown. Specifically, a variable gain vertical amplifier 22 is supplied with a B+ operating potential that reflects changes in beam current. As B+ is reduced, the gain of the amplifier is reduced and vice versa. The output of amplifier 22 is connected to ground through a series connected resistor 28 and capacitor 30 and to a vertical deflection coil 32 which is parallelled by a resistor 34, the combination being returned to ground through an "S" shaping feedback network 36 consisting of a plurality of resistors and capacitors connected as shown. A feedback lead 38 is connected to the negative input of operational amplifier 22. The positive input of amplifier 22 is supplied with a sawtooth vertical drive signal developed by integration of the PWM signal. Feedback network 36 develops an inverted form of the vertical drive waveform for "S" shaping or correction. The gain of variable gain amplifier 22 is changed, as a function of changes in beam current, because of the relationship of beam current and B+, to change the magnitude of the vertical sawtooth drive signal and hence the size of the vertical raster. Therefore, CRT beam current changes are reflected in compensating changes in current in vertical deflection winding 32.

Figure 3:
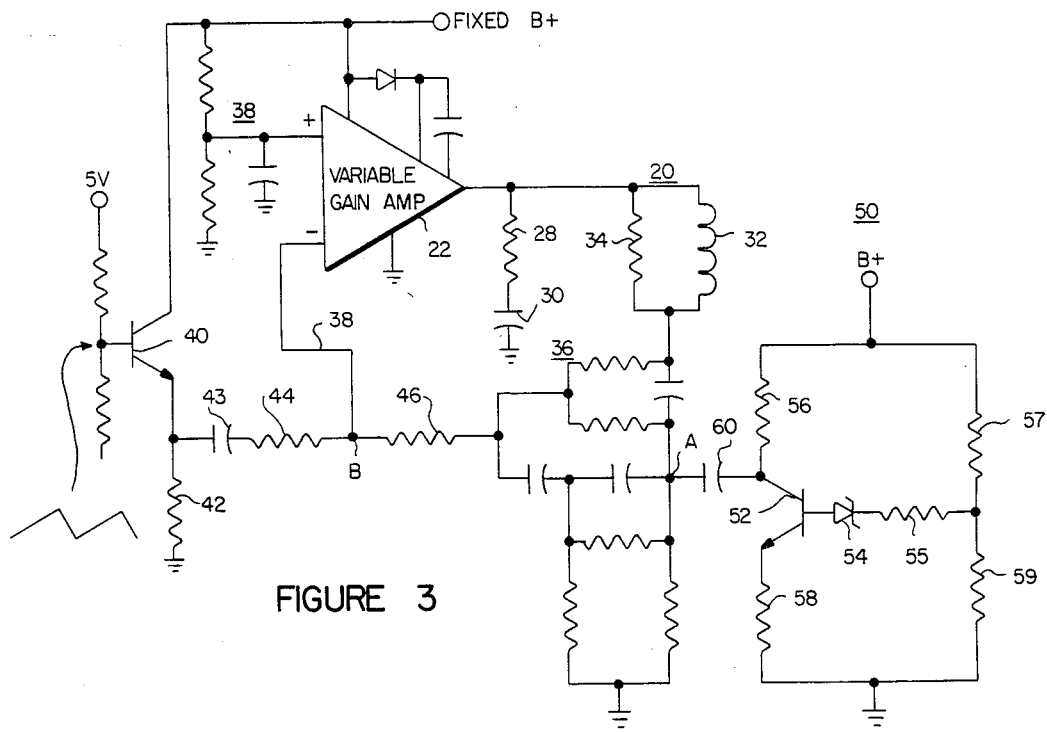
FIG. 3 is a schematic diagram illustrating a specific implementation of the circuit of FIG. 2.

The circuit of FIG. 3 represents an enhanced version of the invention illustrated in FIG. 2 in that a separate voltage sensing means is provided for detecting changes in CRT beam current by reacting to changes in B+ operating potential and the impedance of the feedback network is changed to change the amplifier gain, rather than relying on a change in operating potential to the amplifier to effect the change in gain. The major portion of the circuitry of FIG. 3 (and of FIG. 4) will be seen to be the same as that in FIG. 2 and like parts are indicated by like reference numerals. Note particularly that the B+ to the amplifier is characterized as fixed. The separate voltage sensing means 50 includes a transistor 52 having a base electrode connected through a zener diode 54 and a resistor 55 to the junction of a voltage divider formed by a series pair of resistors 57 and 59 connected between B+ and ground. The collector electrode of transistor 52 is connected through a resistor 56 to B+ and its emitter electrode is connected through a resistor 58 to ground. The collector is connected through a capacitor 60 to junction point A in "S" shaping feedback circuit 36. Thus changes in B+ potential are sensed and applied to the feedback network. Feedback lead 38 is connected to a junction point B which is coupled to feedback network 36 through a resistor 46 and to another circuit supplying the vertical drive signal. Specifically, a vertical driver transistor 40 has its base electrode supplied with the vertical drive signal and its emitter electrode connected to ground through a resistor 42 and coupled, through a capacitor 43 and a resistor 44, to junction point B that is connected to the negative input of operational amplifier 22. The collector electrode of transistor 40 is connected to B+ and the positive input of operational amplifier 22 is connected through a fixed voltage source comprising a voltage divider and capacitor arrangement 38.

In operation, the level of the negative feedback signal applied through resistor 46 to junction B changes with changes in the potential at junction A. This potential is dependent upon the conduction level of transistor 52 in sensing circuit 50 and varies with changes in the B+ supply. The change in DC level at junction B changes the gain of amplifier 22 by altering the feedback applied to junction B. The circuit works well but has a disadvantage in that the capacitor 60 must be fairly large because the impedance level at which the sensing voltage is applied is very low. The circuit of FIG. 4, which is the preferred embodiment of the invention, performs the vertical size compensation function without requiring a large electrolytic capacitor corresponding to capacitor 60.

Figure 4:
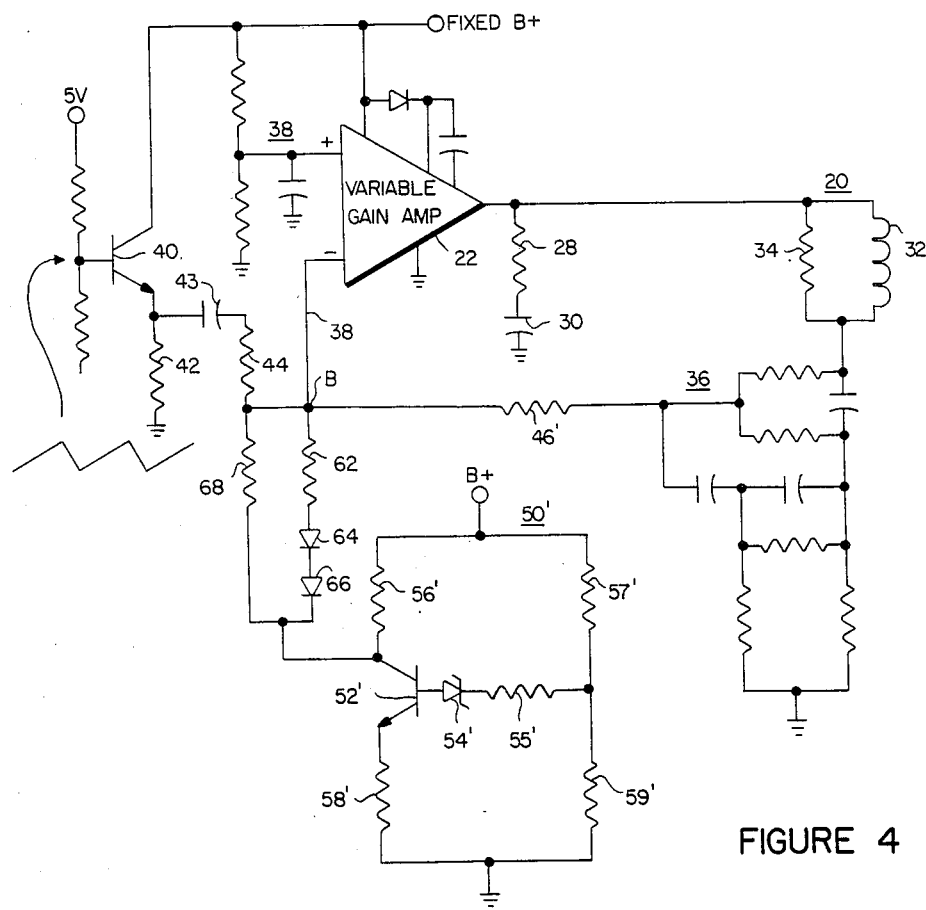
FIG. 4 is a schematic diagram of the preferred implementation of the invention disclosed in FIG. 2.

In FIG. 4, those elements of slightly changed values from their counterparts in FIG. 3 are indicated by primed references. Voltage sensing means 50' has the identical configuration as voltage sensing means 50 of FIG. 3 except that the output of the collector of transistor 52' is supplied to a higher impedance portion of the circuit. Specifically, a network consisting of a resistor 62 and a pair of diodes 64 and 66, all connected in parallel with a resistor 68, is connected between junction point B and the collector of resistor 52'. The remainder of the circuit remains substantially identical to that shown in FIG. 3.

In operation, resistors 57' and 59' establish a voltage divider, the junction of which is at about 12.4 volts DC at 0.8 milliamperes (ma) of CRT beam current, based upon a B+ operating potential of 26 volts DC. The 0.8 ma beam current represents the average height of the raster which is the point at which regulation is to be referenced. Thus the sensing circuit will be activated at this point. Resistor 55', connected in series with zener diode 54', enables the zener diode to turn on "softly" and essentially flattens the knee of the operating characteristic of the diode. The resistors 56' and 58' establish the collector to emitter saturation voltage of transistor 52' at about 2.2 volts DC, again at the 0.8 ma beam current. The circuit consisting of resistors 62 and 68 and diodes 64 and 66 is an impedance control circuit with resistor 62 performing the same function for diodes 64 and 66 as that performed by resistor 55' for zener diode 54'. The resistor thus tends to flatten or bend the knee of the diodes' response curves thus enabling a much smoother transistor of current through the diodes. The smooth transistion is provided to enable the raster size to change smoothly when the diodes are operating. When the CRT beam current rises above 0.8 ma, the saturation voltage of transistor 52' is high thus resulting in diodes 64 and 66 being substantially cut off. The series impedance of the feedback loop therefore consists of essentially resistors 68 and 58' which results in the output of amplifier 22 decreasing and tending to causes a decrease in raster height. However, the increased CRT beam current results in decreased CRT high voltage and the beam is easier to deflect. Thus the lower amplitude vertical drive signal actually results in the raster being kept substantially at the same height. If the CRT beam current approaches zero, the saturation voltage of transistor 52' decreases and diodes 64 and 66 conduct more heavily. This decreases the impedance of the feedback loop by shunting out resistor 68, thus resulting in an increase in the output signal amplitude from amplifier 22 to compensate for the increased high voltage in the CRT.

Experiments have shown that with a 10% change in B+ poperating potential, a 2½% change in vertical deflection coil current will maintain a substantially constant raster height. Thus the circuit of the invention provides a means for compensating the vertical height of the raster with CRT beam current changes in a digital TV environment.

It is recognized that numerous modifications and changes in the described embodiment of the invention will be apparent to those skilled in the art without departing from its true spirit and scope. The invention is to be limited only as defined in the claims.

What is claimed is:

1. A television receiver including a source of B+ operating voltage, a CRT and means for producing a raster on said CRT, said B+ operating voltage being subject to change with changes in the beam current in said CRT;

vertical deflection means including means for developing a vertical drive signal for producing said raster in response to a constant amplitude PWM signal developed by said television receiver, the height of said raster being substantially independent of variations of said B+ operating voltage;

means for compensating for the changes in the vertical size of said raster with changes in said B+ operating voltage comprising:

variable gain amplifier means;

means applying said vertical drive signal to said variable gain amplifier means for changing the amplitude of said vertical drive signal as a function of the gain of said variable gain amplifier means; and means for changing the gain of said variable gain amplifier means as a function of changes in said B+ operating voltage.

2. The television receiver of claim 1 wherein said compensating means further include;

voltage sensing means for developing a voltage indicative of a change in said B+ operating voltage;

feedback means coupled to said vertical deflection means and to said variable gain amplifier means; and means applying the sensed voltage to said feedback means for changing the gain of said variable gain amplifier means.

3. The television receiver of claim 2 wherein said voltage sensing means is coupled to a high impedance portion of said feedback means and functions to change the impedance of said feedback means.

4. The television receiver of claim 3 wherein said voltage sensing means comprises a zener diode reference and a transistor for establishing a voltage level at which said voltage sensing means becomes effective.

5. The television receiver of claim 4 further including an impedance control network comprising a pair of diodes connected in shunt with a resistor, said impedance control network being coupled to said feedback means and to said transistor, whereby changes in conductivity of said transistor change the conductivity of said diodes to vary the impedance of said impedance control network.

* * * * *